Figure 1:
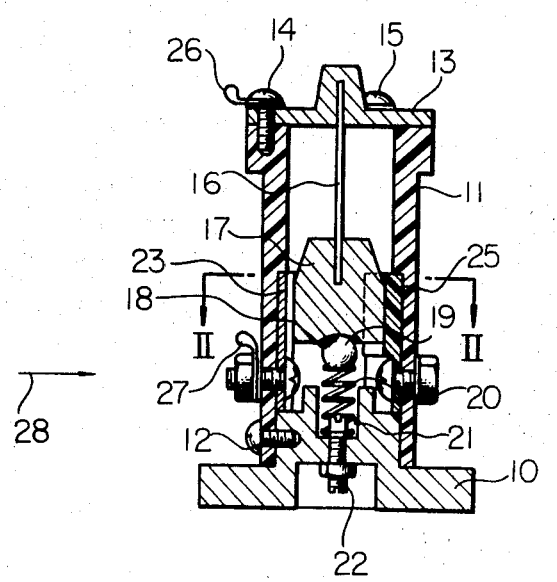

United States Patent

Haruna et al.

[15] 3,639,710
[45] Feb. 1, 1972

[54] TRIGGER SWITCH FOR MOTOR VEHICLE SAFETY DEVICES

[72] Inventors: Takashi Haruna, Yokosuka; Akira Shimano, Yokohama, both of Japan

[73] Assignee: Nissan Motor Company, Limited, Yokohama, Japan

[22] Filed: Feb. 19, 1971

[21] Appl. No.: 116,962

[30] Foreign Application Priority Data

Mar. 18, 1970 Japan..................................45/26023

[52] U.S. Cl..................................200/61.48, 280/150 AB
[51] Int. Cl............................................H01h 35/14
[58] Field of Search..................................200/61.45–61.53; 340/262; 280/150 AB

[56] References Cited

UNITED STATES PATENTS

| | | | |
|---|---|---|---|
| 2,686,853 | 8/1954 | Mathues | 340/262 |
| 3,359,550 | 12/1967 | Christensen | 200/61.51 X |
| 3,542,984 | 11/1970 | Kirk et al. | 200/61.45 |
| 3,549,169 | 12/1970 | Oldberg et al. | 200/61.53 X |

*Primary Examiner*—Robert K. Schaefer
*Assistant Examiner*—M. Ginsburg
*Attorney*—John Lezdey

[57] ABSTRACT

A trigger switch mechanism for motor vehicle safety devices which senses deceleration of a given magnitude resulting from a collision of the motor vehicle in order to actuate the safety devices. The mechanism comprises an upright cylinder within which an electrically conductive rockable weight is normally kept aligned with respect to the surrounding cylinder in a depending manner by a rodlike spring and a coiled spring. An arcuate contact is provided on the inner wall of the upright cylinder in front of the rockable weight at a suitable space therefrom. An arcuate damper is also provided on the inner wall of the upright cylinder opposite to the arcuate contact in such a manner as to partially surround the rockable weight thereby serving to absorb the usual shocks and vibrations of the rockable weight developed during operation of the vehicle. In operation, if the trigger switch mechanism is subjected to deceleration of a given magnitude resulting from a collision, then the rockable weight swings and strikes against the arcuate contact, thereby establishing an electrical connection therebetween.

9 Claims, 2 Drawing Figures

PATENTED FEB 1 1972

3,639,710

INVENTORS
TAKASHI HARUNA + AKIRA SHIMANO
BY John Ledley
ATTORNEY

TRIGGER SWITCH FOR MOTOR VEHICLE SAFETY DEVICES

This invention relates to motor vehicle safety devices and more particularly to a trigger switch mechanism for sensing deceleration of a given magnitude resulting from a collision of the motor vehicle to actuate the safety devices.

Various motor vehicle safety devices have heretofore been proposed and demonstrated, including one having a netting or an air bag which is automatically positioned in a protective position in the event of a collision, thereby avoiding whiplash injuries of the vehicle occupants. These devices, usually, employ explosives to initiate the netting or air bag into action. However, the use of such hazardous initiators sometimes jeopardized the installation of the safety device of this type because of restrictions from local automotive regulations that prohibit the storage of hazardous materials in motor vehicles.

It is therefore an object of this invention to provide a new and improved trigger switch mechanism that is capable of sensing deceleration of a given magnitude resulting from a collision so as to actuate a motor vehicle safety device without use of any hazardous material such as chemical explosives.

It is another object of this invention to provide a quick responding trigger switch mechanism for a motor vehicle safety device.

It is a further object of this invention to provide a trigger switch mechanism which is simple in construction and has an increased reliability.

Figure 2:
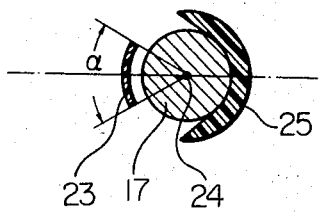

In the drawings:

FIG. 1 is a longitudinal section of a trigger switch mechanism embodying this invention; and FIG. 2 is a cross section taken along the line II—II of FIG. 1, showing the relationship in position between a rockable weight and two arcuate members used in the trigger switch mechanism.

Referring to FIG. 1, there is shown an example of a trigger switch mechanism according to this invention, which forms part of a motor vehicle safety device having a netting or an air bag (not shown). As shown, the switch mechanism comprises a base member 10 on which an electrically nonconductive cylinder 11 is fixedly mounted in an upright manner as by a screw 12. An electrically conductive plate 13 is mounted atop the cylindrical member 11 as by screws 14 and 15. A rodlike spring 16 is anchored at its uppermost end to the plate 13 and depends therefrom. The rodlike spring 16 carries at its lowermost end a rockable weight 17 which is of generally cylindrical construction, as is shown in FIG. 2. The rockable weight 17 has a recessed control portion 18 formed in its lower end surface.

A ball 19 is forced against the recessed control portion 18 by a coiled spring 20 to maintain the alignment of the weight 17 relative to the surrounding cylinder 11. The coiled spring 20 is mounted in a cylindrical recess 21 formed in the center of the base member 10. The force of compression of the coiled spring 20 can be adjusted by an adjustment screw 22 provided at the bottom of the base member 10.

An arcuate member 23 which acts as an electrical contact is secured to the inner wall of the cylindrical member 11 in front of the rockable weight 17 at a suitable space therefrom. Preferably, the arcuate member 23 is positioned concentrically with respect to the rockable weight 17, as is shown in FIG. 2. The angle α which the arcuate member 23 forms with respect to the center 24 of the rockable weight 17 depends upon the azimuth angle through which detection of mechanical shocks resulting from a collision is desired.

Another arcuate member 25 is secured to the inner wall of the cylindrical member 11 opposite to the arcuate member 23 in such a manner as to partially surround the rockable weight 17, as is shown in FIG. 2. In a preferred embodiment, the arcuate member 25 is made of electrically nonconductive material and acts as a damper which absorbs the usual shocks or vibrations of the rockable weight 17 developed or arising during operation of the vehicle.

The plate 13, rodlike spring 16, rockable weight 17 and arcuate member 23 are all made of electrically conductive material. Connections to a control circuit for actuating a motor vehicle safety device (not shown) are made by leads 26 and 27 which are electrically connected to the plate 13 and the arcuate member 23, respectively.

It is to be noted that the force of compression of the coiled spring 20 is so adjusted that if the switch mechanism thus constructed is subjected to deceleration in the direction of arrow 28 and of a given magnitude, then rockable weight 17 swings and strikes against the arcuate member 23.

In operation, when the trigger switch mechanism is subjected to mechanical shocks of a given magnitude, for example, due to a collision, the rockable weight 17 is forced forwardly against the actions of the rodlike springs 16 and coiled springs 20, coming into contact with the arcuate member 23 whereby a circuit connection between the leads 26 and 27 is established.

As has been described above, this invention provides a new and improved trigger switch mechanism for motor vehicle safety devices which is capable of sensing deceleration of a given magnitude resulting from a collision with increased reliability so as to actuate the safety devices without use of any hazardous materials such as chemical explosives.

What is claimed is:

1. A trigger switch mechanism for sensing deceleration of a given magnitude resulting from a collision of the motor vehicle to actuate safety devices mounted thereon, said mechanism comprising: a base member, a cylindrical member mounted on said base member in an upright manner, a plate member mounted atop said cylindrical member, a rodlike spring anchored at its uppermost end to said plate member, an electrically conductive rockable weight carried by said rodlike spring and having a recessed control portion formed in its lower end surface, a ball member held in said recessed control portion by a regulated spring action, a coiled spring holding said ball member in said recessed control portion, a contact member provided on the inner wall of said cylindrical member in front of said rockable weight at a suitable space therefrom, and a damping member provided on the inner wall of said cylindrical member opposite to said contact member for partially surrounding said rockable weight thereby serving to absorb the usual shocks and vibrations of said rockable weight developed during operation of the motor vehicle, said rockable weight being forced forwardly coming into contact with said contact member when said trigger switch mechanism is subjected to said deceleration.

2. A trigger switch mechanism according to claim 1, in which said cylindrical member is made of electrically nonconductive material.

3. A trigger switch mechanism according to claim 1, in which said plate member is made of electrically conductive material.

4. A trigger switch mechanism according to claim 1, in which said rodlike spring is made of electrically conductive material.

5. A trigger switch mechanism according to claim 1, in which said rockable weight is of generally cylindrical construction and said contact member and damping member are in an arcuate shape.

6. A trigger switch mechanism according to claim 5, in which said contact member is positioned concentrically with respect to said rockable weight.

7. A trigger switch mechanism according to claim 1, in which said base member has a cylindrical recess therein and said coiled spring is mounted in said recess.

8. A trigger switch mechanism according to claim 7, in which an adjustment screw is provided at a bottom of said base member for adjusting the force of compression of said coiled spring.

9. A trigger switch mechanism according to claim 1, in which said damping member is made of electrically nonconductive material.